Figure 2:
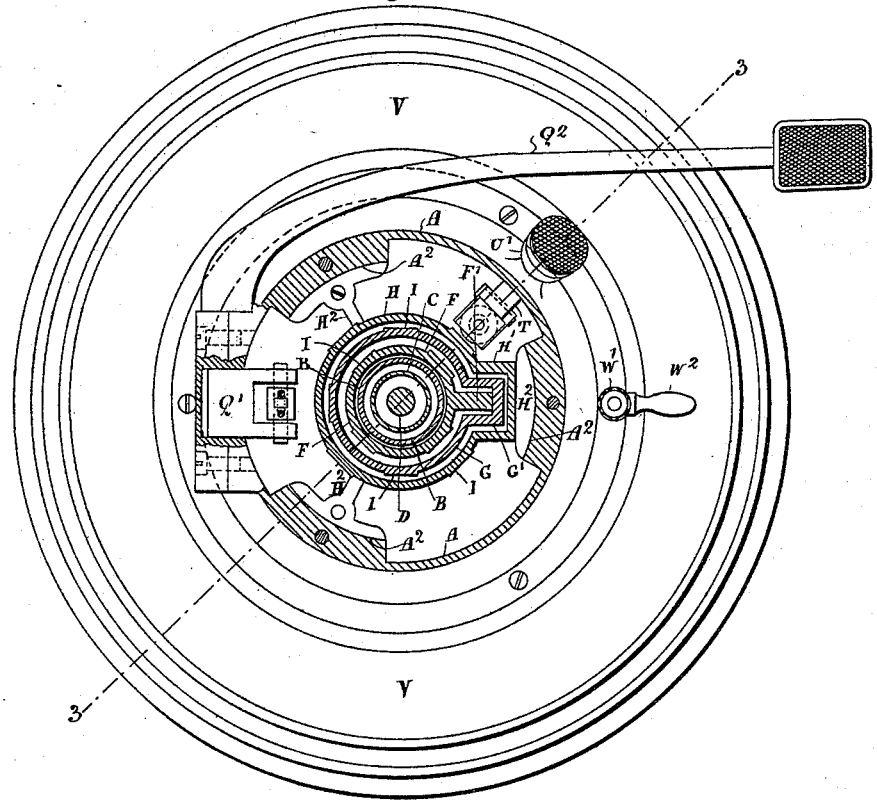

No. 668,321. Patented Feb. 19, 1901.
R. W. SONNEX.
SEAT RAISING OR LOWERING MECHANISM FOR DENTAL CHAIRS.
(Application filed Apr. 26, 1900.)
(No Model.) 3 Sheets—Sheet 1.

No. 668,321. Patented Feb. 19, 1901.
R. W. SONNEX.
SEAT RAISING OR LOWERING MECHANISM FOR DENTAL CHAIRS.
(Application filed Apr. 26, 1900.)
(No Model.) 3 Sheets—Sheet 2.

Witnesses. Inventor.
A. M. Parkins Richard William Sonnex,
Sylvester Thomas By his Attorneys,
Dresson, Davidson & Wight No. 668,321. Patented Feb. 19, 1901.
R. W. SONNEX.
SEAT RAISING OR LOWERING MECHANISM FOR DENTAL CHAIRS.
(Application filed Apr. 26, 1900.)
(No Model.) 3 Sheets—Sheet 3.

UNITED STATES PATENT OFFICE.

RICHARD WILLIAM SONNEX, OF MIDDLESEX COUNTY, ENGLAND, ASSIGNOR TO THE DENTAL MANUFACTURING COMPANY, LIMITED, OF SAME PLACE.

SEAT RAISING OR LOWERING MECHANISM FOR DENTAL CHAIRS.

SPECIFICATION forming part of Letters Patent No. 668,321, dated February 19, 1901.

Application filed April 26, 1900. Serial No. 14,455. (No model.)

*To all whom it may concern:*

Be it known that I, RICHARD WILLIAM SONNEX, engineer, a subject of the Queen of Great Britain, residing at 6 Lexington street, Golden Square, in the county of Middlesex, England, have invented certain new and useful Improvements in Seat Raising or Lowering Mechanism for Dental Chairs, of which improvements the following is a specification.

My improvements relate mainly to hydraulic lifting mechanism for the seats of dental chairs in which a telescopic hydraulic press or lifting-jack surrounded by telescopic guide-cylinders is used, fitting one within the other and within a cylindrical pedestal.

The improvements are shown in the drawings hereunto annexed.

Figure 1:
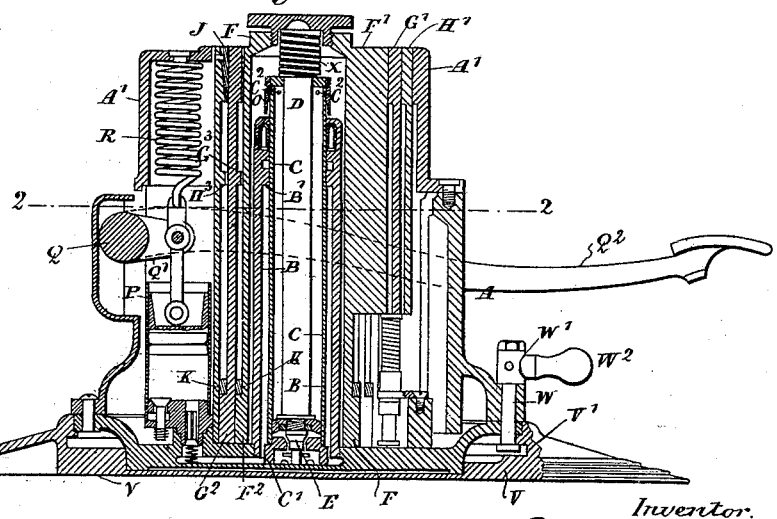
Figure 3:
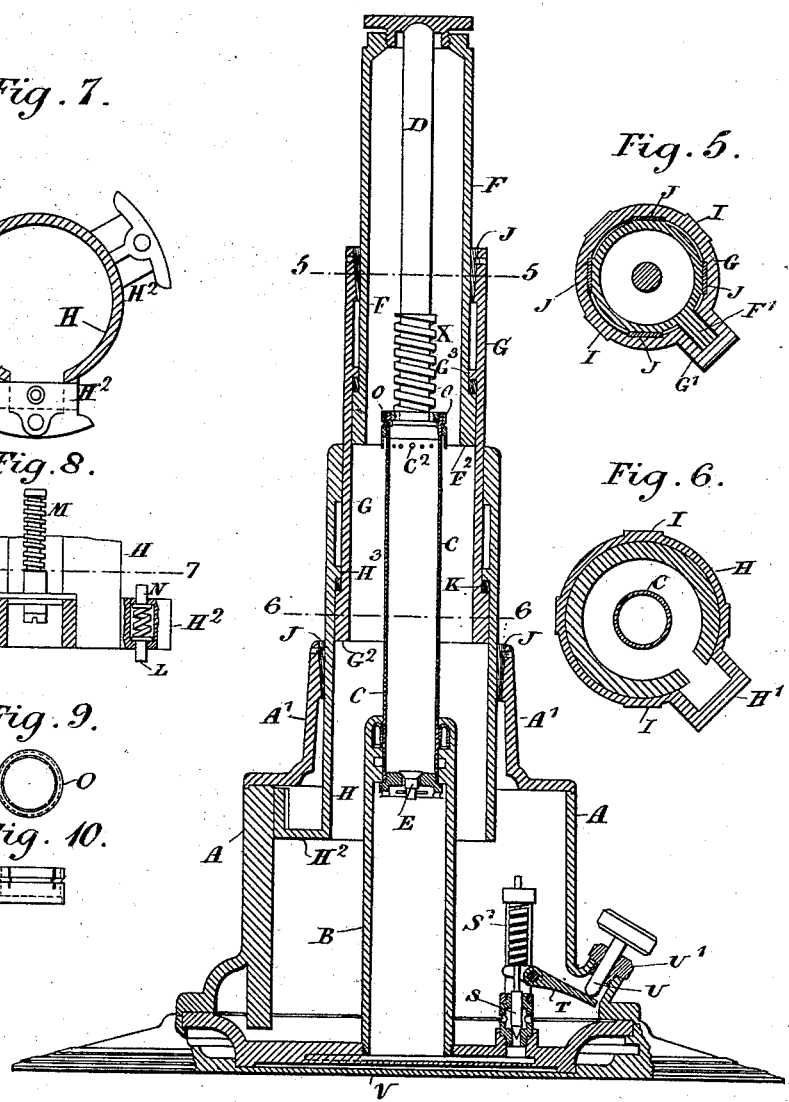
Figure 7:
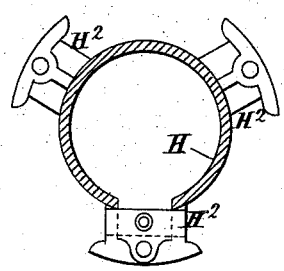
Figure 8:
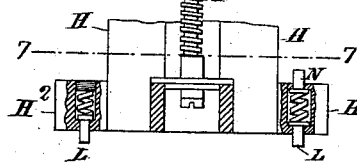
Figure 9:
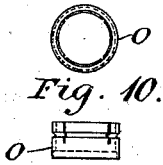
Figure 10:
Figure 4:
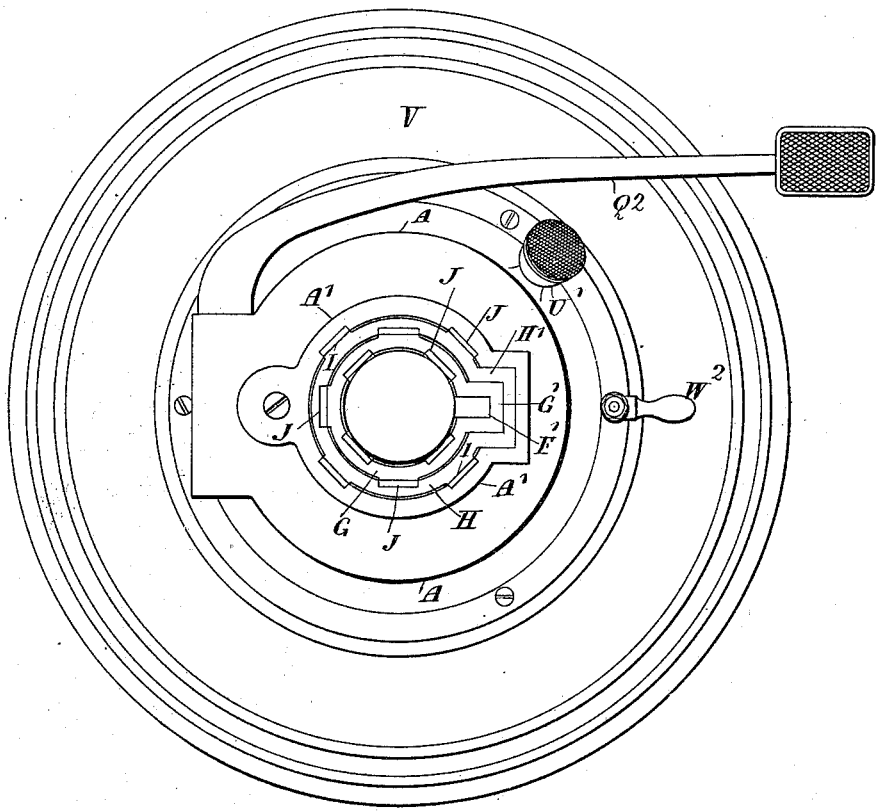

Figure 1 is a vertical section of the lifting mechanism with its parts in their lowest position. Fig. 2 is a horizontal section on the line 2 2, Fig. 1, of the parts in their lowest position. Fig. 3 is a vertical section on the line 3 3, Fig. 2, and shows the guide-cylinders and rams fully extended. Fig. 4 is a plan view of the top of the pedestal and guide-cylinders. Fig. 5 is a section through the line 5 5, Fig. 3, and Fig. 6 a section through the line 6 6. Fig. 7 is a horizontal section through the outermost guide-cylinder, taken on the line 7 7, Fig. 8. Fig. 8 is a side elevation, with parts in section, of the lower portion of the outermost guide-cylinder. Figs. 9 and 10 are a plan and an elevation of a spring-clip sleeve for diverting oil downward from relief-holes in the upper part of the inner hydraulic lifting-cylinder.

In the figures, A is the pedestal, having a cap or cover A'.

B is a vertical hydraulic cylinder fixed at its lower end to the bottom of the pedestal.

C is an inner cylinder, which can slide up and down through a packing at the top of the outer cylinder.

C' is an enlargement at the bottom of the cylinder C, and B' an inwardly-projecting ring in the interior of the cylinder B for the enlargement C' to come against when the cylinder C has completed its lift.

D is a piston rod or ram, which at its lower end carries packing to fit to the interior of the cylinder C.

$C^2$ represents relief-holes in the sides of the cylinder C to allow any oil pumped into the cylinder to escape and pass back to the oil-reservoir when the ram D has completed its lift.

E is a valve opening upward at the bottom of the cylinder C.

The cylinders B and C, piston or ram D, and valve E constitute what I term herein a "hydraulic press" or "hydraulic lifting-jack," by which the chair-seat may be raised or lowered.

F is the inner guide-cylinder, closed at the top by a cap, which supports the chair-seat and rests on the top of the ram D.

G is a second guide-cylinder surrounding the cylinder F, and H an outer guide-cylinder. The number of guide-cylinders used may, however, be varied.

F', G', and H' are radial projections on the cylinders F G H. These fit one within the other and the outer one within a corresponding portion of the cap A'. In this way all the guide-cylinders are restrained from turning. The radial projections, as shown in Fig. 1, do not extend down to the bottom of the cylinders in order that they may not dip into the oil-supply, which is contained in the bottom of the pedestal, so that when raised they do not carry up oil with them, and when the guide-cylinders are all fully raised the exposed portions of their exterior are free from oil. The lower ends of the cylinders F G are at $F^2$ $G^2$ slightly enlarged in diameter and turned on the exterior, so that the enlargement $F^2$ may fit closely to the interior of the cylinder G and the enlargement $G^2$ to the interior of the cylinder H. The lower end of the cylinder H is formed with three radial arms $H^2$, extending from it, and the outer ends of these arms are machined or turned to fit to corresponding vertical guide-surfaces $A^2$ on the interior of the pedestal.

Three or more flat longitudinal tangential guide-surfaces I are formed on the exterior of each of the guide-cylinders F G H. These fit against corresponding flat surfaces on wedge-pieces J, which are fixed to the upper part of the interior of the cylinders and of the pedestal-cap A' and serve to keep the cylinders steady one within the other, the wedges allowing of adjustment to obtain a close fit.

K K are rings of leather or like material on the top of the enlargements $F^2 G^2$. $H^3 G^3$ are inwardly-projecting rings on the interior of the guide-cylinders H and G for the leather rings K to come against when the cylinders complete their lift, and thereby avoid jar.

To avoid jar when each guide-cylinder F, G, or H comes to rest at the end of its descent, the radial arms $H^2$, which extend outward from the lower part of the outer guide-cylinder H, carry buffer-pins, which are pressed upward or downward by the action upon them of coiled springs, as shown at Fig. 8. Two such buffer-pins L L, which project downward gradually, arrest the downward movement of the outer guide-cylinder H when they strike against the bottom of the pedestal. A third buffer-pin M projects upward and is in such a position that the lower ends of the radial projections F' G' of the guide-cylinders F G may come down onto it as these cylinders complete their descent. A fourth pin N may be used to come against the under side of the cover A of the pedestal and gradually bring the outer guide-cylinder H to rest at the end of its upward movement.

X is a coiled spring around the piston rod or ram D. It rests upon the top of the cylinder C and serves to bring the inner guide-cylinder F and the chair-seat, which it carries, quietly to rest at the end of their downward movement.

O is a slit spring-clip ring to surround the top of the inner hydraulic cylinder C and serve to deflect downward any oil which passes out through the relief-holes $C^2$.

P is a pump by which oil can be pumped into the lower end of the cylinder B. Its plunger can be forced downward by the action of a short lever-arm Q' on the axis Q of a treadle-lever $Q^2$ and is normally drawn upward by the action of a coiled spring R.

S is a relief-valve by which oil can be allowed to pass back from the cylinder B into the oil-reservoir. It is held down in its closed position by the action upon it of the coiled spring S, which acts against the pressure of the liquid in the cylinder.

T is a small lever by which the valve can be lifted.

U is a small plunger which passes through a small screw-cap U', which closes an opening in the lower part of the pedestal. Its lower inner end bears against one arm of the lever T, while its upper end is formed with a head, by pressing upon which with the foot the plunger can be forced downward and by turning the lever T cause the valve to be opened. If the screw-cap U' is unscrewed, oil can be poured through the opening into the reservoir.

V is a ring-shaped foot within which the lower part of the pedestal rests. The pedestal can be turned freely within the ring and can be locked to it in any desired position by giving a partial turn to a vertical spindle W. The vertical spindle passes downward through a projection on the lower end of the pedestal. Its lower end has around it a projecting flange, which extends into a groove V', formed all around the interior of the ring V. On the upper end of the spindle W is a head W', inclined on its under side.

$W^2$ is an arm extending from the head, by acting upon which with the foot the spindle can be turned in either direction desired. By turning the spindle in one direction the inclined surface can be caused to bind against the correspondingly-inclined surface below it, while if turned in the opposite direction the inclined surfaces can be brought parallel with one another and then do not bind together. When in this position, the pedestal can be turned freely within the ring.

The action is as follows: When liquid is pumped into the outer cylinder of the lifting-jack or press by working up and down the treadle-lever $Q^2$, the inner hydraulic cylinder C rises until the valve E, which is held down by the lower end of the ram D resting upon it, closes. The ram D and cylinder C then both rise together and lift the seat. When the cylinder C comes to the end of its upward stroke, any further amount of liquid pumped into the cylinder causes the valve E to lift, and liquid then passes into the cylinder C and forces up the ram D. When the ram comes to the end of its stroke, its lower end passes beyond the small openings $C^2$. Any further liquid pumped into the cylinders will then escape through these openings and pass back to the oil-cistern at the bottom of the pedestal. As the ram D and cylinder C commence to rise they carry up with them the inner guide-cylinder F. After a time the leather ring K on the top of the enlargement $F^2$ on the lower end of this cylinder comes against the inwardly-projecting ring $G^3$ of the guide-cylinder G, and the cylinder G is then lifted also. Similarly after a time the outer guide-cylinder commences to be lifted and continues to be lifted until the ram D arrives at the end of its upward stroke. To lower the seat, the valve S is opened by pressing with the foot upon the head of the plunger U. Oil then passes back from the lower end of the cylinder B through this valve into the oil-reservoir. The valve E at the bottom of the cylinder C prevents oil from escaping from the cylinder, so that the cylinder and ram descend together until just before the lower end of the cylinder comes down onto the bottom of the oil-reservoir. The stem of the valve strikes against the bottom, and the valve is thereby opened, and liquid is then free to pass away from the cylinder C and the ram D descends. The valve E insures that the ram and cylinder C shall both rise and descend uniformly. If no valve were used, the movement would not be uniform, as the ram might rise or descend for a distance without the cylinder C moving with it if for any reason the cylinder C stuck fast for a time. The cylinder C might then get set free and be caused to rise suddenly, and so allow the seat to drop a distance and in this way produce irregularities in the movement; but by providing a valve E in the bottom of the cylinder C the ram if it has once been raised within the cylinder is prevented from again moving inward into it until the valve is opened by its stem coming down onto the bottom of the pedestal. As the guide-cylinders and ram make their downward movement the guide-cylinders at first all descend together until the outermost guide-cylinder H comes to the end of its downward movement, and so on until all have descended into the pedestal and have successively been brought to rest without shock, as above explained.

Having thus fully described the construction and operation of my improvements in seat raising and lowering mechanism, what I claim therein as new and as of my own invention is—

1. The combination of a hydraulic cylinder, an inner cylinder working therein, a seat-supporting piston fitting in this cylinder, means for forcing liquid into the outer cylinder, and for allowing it to escape therefrom, a valve in the inner cylinder which valve is kept closed during the time the inner cylinder is being lifted by reason of the seat-supporting piston resting upon it, and means for opening the valve just before the inner cylinder completes its downward movement to allow the liquid to escape therefrom and thus permit the seat-supporting piston to descend.

2. The combination of a pedestal, a hydraulic press or telescopic lifting-jack, mounted therein, telescopic guide-cylinders surrounding the lifting-jack, the inner guide-cylinder being carried by the hydraulic piston, and a longitudinal radial projection on the upper portion of each guide-cylinder, the projections on the inner guide-cylinders fitting within the projections on the outer ones, and the outermost projection fitting within a corresponding recess in the pedestal-cover.

3. The combination of a pedestal, a hydraulic press or telescopic lifting-jack mounted therein, telescopic guide-cylinders surrounding the lifting-jack, the inner guide-cylinder being carried by the hydraulic piston, a longitudinal radial projection on the upper portion of each guide-cylinder, the projections on the inner guide-cylinders fitting within the projections on the outer ones, and the outermost projection fitting within a corresponding recess on the pedestal-cover, an enlargement on the lower end of each inner guide-cylinder fitting in the interior of the guide-cylinder outside it, and stops on the interior of these cylinders for these enlargements to come against, to limit the extent to which one cylinder can be withdrawn from the other.

4. The combination of a pedestal, a hydraulic press within it, telescopic concentric guide-cylinders surrounding the hydraulic press, a longitudinal radial projection on the upper portion of each guide-cylinder, the projections on the inner ones fitting within the projections on the outer ones and the outermost projection fitting within a corresponding recess on the pedestal-cover, three radial projections at the bottom of the outermost guide-cylinder fitting at their ends to corresponding vertical guide-surfaces on the interior of the pedestal, a pump for supplying liquid under pressure to the hydraulic cylinder carried by the bottom of the pedestal and situated in one of the spaces between these radial projections and a valve for allowing liquid to escape from the hydraulic cylinder and situated in another of the spaces between the radial projections.

5. The combination of a pedestal, a hydraulic press within it, telescopic concentric guide-cylinders surrounding the hydraulic cylinder, longitudinal radial projections on the upper portion of each guide-cylinder all fitting one within the other, three projections at the bottom of the outer guide-cylinder, spring buffer-pins carried by one or more of these projections to bring the outer cylinder to rest at the end of its downward movement and another buffer-pin carried by another of the projections to come below the radial projections on the upper part of the inner guide-cylinders and gradually check the downward movement of these cylinders.

6. The combination of a pedestal, a hydraulic press within it, telescopic concentric guide-cylinders surrounding the hydraulic cylinder, longitudinal radial projections on the upper portion of each guide-cylinder all fitting one within the other and the outermost one fitting within a corresponding recess in the cylinder-cover, three or more flat longitudinal and tangential guide-surfaces at distances apart on the exterior of the sides of each guide-cylinder and wedges fixed to the upper part of the interior of the outer cylinders and to the pedestal cap or cover to fit to these flat surfaces.

RICHARD WILLIAM SONNEX.

Witnesses:
WILFRED CARPMAEL,
HERBERT EDWARDS.